Patented Sept. 15, 1925.

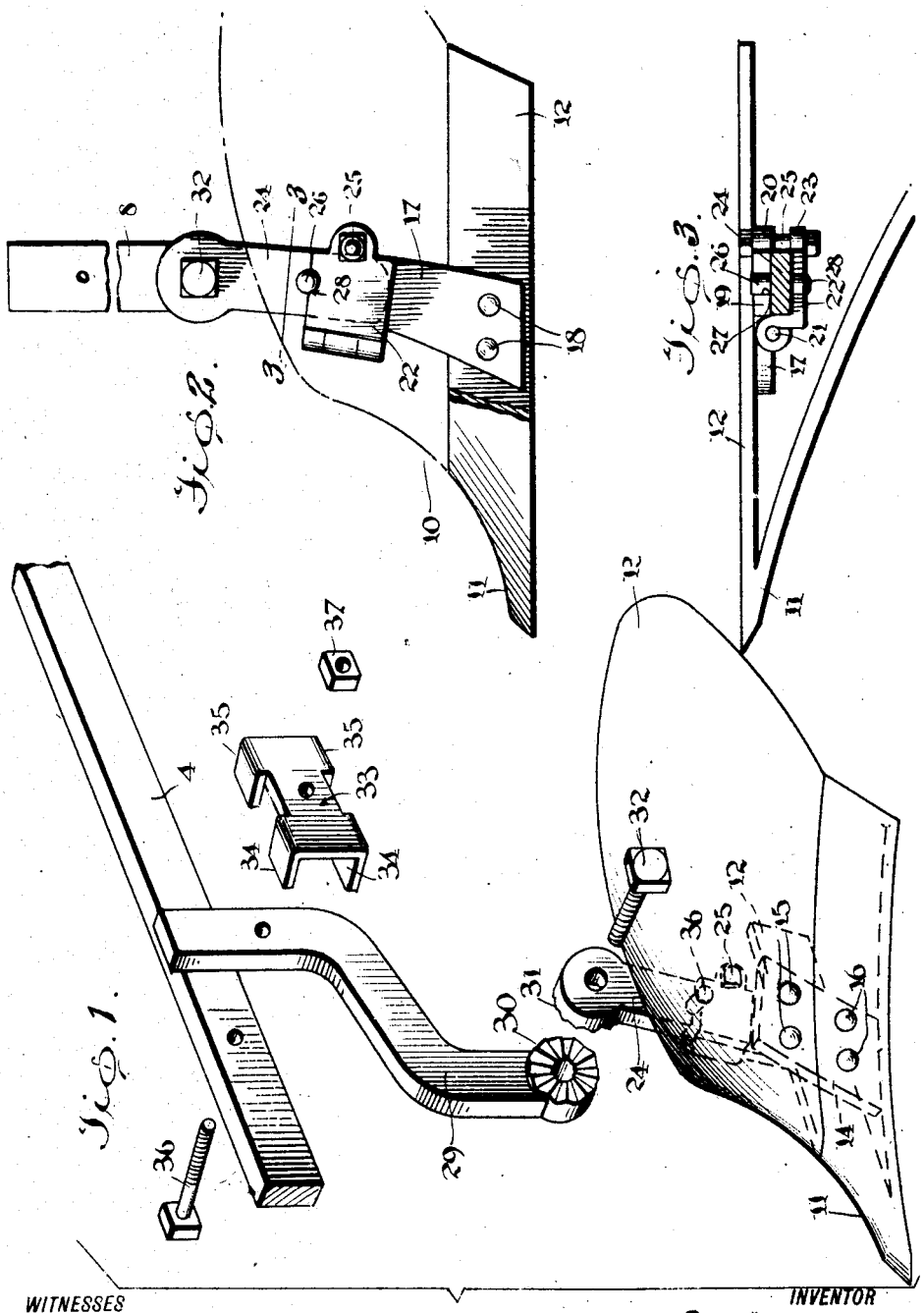

1,553,685

UNITED STATES PATENT OFFICE.

WALTER BURGESS GRESHAM, OF ATLANTA, ILLINOIS.

ATTACHMENT FOR CORN CULTIVATORS.

Application filed April 18, 1922. Serial No. 554,542.

*To all whom it may concern:*

Be it known that I, WALTER BURGESS GRESHAM, a citizen of the United States, and a resident of Atlanta, in the county of Logan and State of Illinois, have invented certain new and useful Improvements in Attachments for Corn Cultivators, of which the following is a specification.

My invention relates to improvements in cultivators, and it consists in the combinations, constructions and arrangements herein described and claimed.

An object of my invention is to provide an attachment having means for replacing the usual shovels or blades of a cultivator of ordinary construction, whereby the cultivator is adapted to break and turn the soil more effectively than is possible with an ordinary cultivator and to break down and cover weeds between rows of plants which would not be covered by the blades or shovels of an ordinary cultivator.

A further object of my invention is to provide an attachment of the character described which comprises means adapted to be substituted for the usual blades or shovels of a cultivator of ordinary construction, without any extensive changes, if any, being required in the construction of the cultivator.

A still further object of my invention is to provide an attachment of the character described for cultivators in which the means to be substituted for the usual cultivator shovels or blades can be quickly and easily converted from blades adapted to penetrate into the earth to a relatively great depth, in the manner of plow blades, into blades adapted to cut the earth along the surface.

Other objects and advantages will be apparent from the following description, and the novel features of the invention will be outlined more particularly in the appended claims.

My invention is illustrated in the accompanying drawings forming a part of this application, in which:

Figure 1 is a perspective view showing a fragmentary portion of a cultivator beam, together with associated elements of the attachment in detached or separated position, Figure 2 is a side elevation, showing a fragmentary portion of a blade comprised in the attachment, together with a portion of a shank appurtenant thereto, Figure 3 is a sectional view, taken substantially along the line 3—3 of Figure 2.

In lieu of the usual shallow cutting cultivator blades or shovels, illustration of which has been omitted from the drawings, my invention provides a plurality of earth working members or blades, such as indicated generally at 10 and which is best seen in Fig. 1. Each blade 10 comprises a share 11 provided with a land side 12 diverging from the body of the share. A moldboard 13 is adapted to be detachably secured to the body of the share through the agency of a connecting plate 14 which has a portion thereof adapted to be secured to the moldboard by means of two bolts 15 or like fastening elements and another portion adapted to be attached to the body of the share through the agency of two other bolts indicated at 16.

Each of the blades 10 is provided with a lower section or stub 17 of a shank for connecting the blade with one of the beams 4. Each section 17 is secured to the land side of the blade, as by means of rivets 18 or like fastening elements.

Each lower section 17 is enlarged adjacent to its upper end to provide a hinge portion 19 provided with an ear 20 extending laterally of one end thereof and swingingly supporting at its other edge, as by means of a pintle 21, a cooperating hinge plate or clamping member 22 which is provided with an ear 23 adapted to be positioned in alinement with the ear 20 when the hinge plate or clamping member 22 has been swung toward the hinge portion 19 to clampingly embrace the lower portion of an intermediate shank section 24.

It will be obvious that the intermediate section 24 will be releasably attached to the lower section 17 and held against movement relatively to the latter when a coupling bolt 25 is projected through the alined ears 20—23 and a nut thereon is tightened and a pin 26 extending through a transverse opening formed in the intermediate section has the ends thereof resting in alined seats 27 and 28 respectively in the hinge member 19 and the clamping member 22, as clearly shown in Figs. 2 and 3.

The intermediate section 24 is connected adjacent to its upper end with an upper section in any suitable known manner, whereby the angular relation of the section 24 to the upper section may be varied to vary the depth to which the blade 10 will penetrate below the surface of the earth and whereby the intermediate section 24 will be releasably held in adjusted angular relation to the upper section of the shank. In Fig. 1, I show an upper section 29 having the upper and lower end portions thereof offset in respect to each other. The upper section 29 is provided with radial teeth 30 adjacent to its lower end on the side thereof which will be contiguous to the upper portion of an intermediate section 24. The latter is provided with radially extending teeth 31 adapted to engage the teeth 30 when the upper portion of the intermediate section 24 is clamped against the lower portion of the section 29 by means of a clamping bolt 32, or the like. It will be apparent that the angular relation of the intermediate section 24 to the upper section 29 may be varied at will when the construction just described is provided. A clamping plate 33 has pairs of laterally extending parallel lugs 34—34 and 35—35 respectively, at the opposite ends thereof. The pairs of lugs are adapted to embrace both the upper end portion of the section 29 and a beam 4, and a clamping bolt 36 is projected through the beam 4, the upper end portion of the section 29, the clamping plate 33, whereby the section 29 will be releasably secured to the beam 4 and held against movement relatively to the latter when a nut 37 in threaded engagement with the bolt 36 is tightened against the plate 33. The beam 4 may be a usual part of a cultivator not shown.

From the foregoing description of the various parts of the device, the operation thereof may be readily understood.

The blades comprised in my attachment will cut or penetrate into the earth to a greater depth and will overturn the soil broken thereby more effectively than the usual cultivator shovels or blades. When it is desired to loosen the soil close to the surface with my attachment, it is only necessary that the bolts 16 be detached from the shares 11 and the moldboard 13 detached. The blades comprised in my attachment will then be converted into surface blades and can be used as such.

Obviously, my invention is susceptible of embodiment in forms other than that illustrated in the accompanying drawings and described herein, and I therefore consider as my own, all modifications and adaptations of the form herein described and illustrated as fairly fall within the scope of the appended claims.

I claim:—

1. In a cultivator, a blade comprising a share having a land side, a moldboard detachably secured to the share, and a shank for connecting the land side of said blade with a supporting member, said shank consisting of an upper section having upper and lower end portions offset in respect to each other, a lower section secured to the land side, an intermediate section releasably secured at its lower end to the upper end of the lower section, clamping means for detachably securing said upper section to a support, and a horizontal fastening element for releasably securing the upper end portion of the intermediate section against the lower end portion of the upper section, said upper section and said intermediate section having teeth on the said end portions thereof adapted to coengage to hold the intermediate section in adjusted angular relation to the upper section.

2. In a cultivator, a shank comprising a lower section adapted to be secured at its lower end to a blade and a second section having a swinging clamping member attached to the lower end portion thereof, said clamping member being adapted to swing to and from position to clamp the upper end portion of the lower section against the lower end portion of the second section, means for releasably holding the clamping member against movement from position to clamp the lower section against the second section, means carried by said lower section for engaging with the second section and the clamping member to aid said clamping member and said second section in holding the second section and the lower section against relative movement, and means whereby said second section may be attached to a support.

WALTER BURGESS GRESHAM.